United States Patent
Shiao et al.

(10) Patent No.: US 9,428,686 B2
(45) Date of Patent: Aug. 30, 2016

(54) PHOTO-LUMINESCENCE COATING AND APPLICATION THEREOF

(71) Applicant: Arthur Shiao, Taipei (TW)

(72) Inventors: Arthur Shiao, Taipei (TW); Feng-Hui Cheng, Taipei (TW)

(73) Assignee: Arthur Shiao, Taipei ( * ) Notice: Subject to any disclaimer, the term of this patent is extended or adjusted under 35 U.S.C. 154(b) by 501 days.

(21) Appl. No.: 13/691,717

(22) Filed: Nov. 30, 2012

(65) Prior Publication Data

US 2013/0337242 A1  Dec. 19, 2013

(30) Foreign Application Priority Data

Dec. 1, 2011  (TW) .............................. 100144171 A

(51) Int. Cl.
- B32B 15/04 (2006.01)
- B32B 17/06 (2006.01)
- C09K 11/02 (2006.01)
- B32B 3/10 (2006.01)

(52) U.S. Cl.
CPC ............... C09K 11/025 (2013.01); B32B 3/10 (2013.01); B32B 17/06 (2013.01); *Y10T 428/24926* (2015.01)

(58) Field of Classification Search
USPC ....... 428/426, 428, 432, 688, 689, 699, 701, 428/702
See application file for complete search history.

(56) References Cited

U.S. PATENT DOCUMENTS

| | | | |
|---|---|---|---|
| 7,319,289 B2 * | 1/2008 | Suehiro | H01L 33/501 257/E33.059 |
| 7,811,471 B2 * | 10/2010 | Iwao | C03C 3/068 252/301.4 F |
| 7,820,074 B2 * | 10/2010 | Kim | C03C 1/008 252/301.4 F |
| 8,206,613 B2 * | 6/2012 | Fujita | C03C 8/08 252/301.4 F |
| 2006/0214134 A1 * | 9/2006 | Masuda | C03C 3/089 252/301.4 F |
| 2009/0314989 A1 * | 12/2009 | Iwao | C03B 19/06 252/301.4 F |
| 2010/0155666 A1 * | 6/2010 | Fujita | C03C 8/08 252/301.4 P |
| 2010/0263723 A1 * | 10/2010 | Allen | C09K 11/02 136/259 |
| 2012/0014111 A1 * | 1/2012 | Welten | 362/296.08 |
| 2012/0107622 A1 * | 5/2012 | Borrelli et al. | 428/428 |
| 2012/0219750 A1 * | 8/2012 | Zhou | C03C 27/06 428/76 |
| 2012/0308760 A1 * | 12/2012 | Zhou | C09K 11/02 428/68 |

FOREIGN PATENT DOCUMENTS

JP   2008143978   *  6/2008
WO   WO2010/110652 *  9/2010

OTHER PUBLICATIONS

JP-2008143978 English machine translation, 2015.*

* cited by examiner

*Primary Examiner* — Lauren R Colgan

(57) ABSTRACT

This invention proposes a photo-luminescence coating and its applications. The photo-luminescence coating is a mixture of photo-luminescence phosphors, glass powder, macromolecule compounds and solvent. The photo-luminescence coating is coated on a substrate and, after a drying, de-binding and sintering process, a photo-luminescence glass layer is formed, and especially the pattern can be designed. The photo-luminescence glass is made from a solidifying procedure of a melt glass mixed with photo-luminescence phosphors, and especially can be made to have a specialized shape.

5 Claims, 3 Drawing Sheets

PHOTO-LUMINESCENCE COATING AND APPLICATION THEREOF

FIELD OF THE INVENTION

The present invention generally relates to a photo-luminescence coating and its applications.

DESCRIPTION OF THE RELATED ART

Luminous or luminescent tiles are coated by the mixture of luminous phosphors with polymer binder/macromolecular compounds or glass powder, and then processed by drying, low-temperature baking or high-temperature sintering to have the feature of luminosity.

The luminous tiles or glass stores the light energy under irradiation of sunlight, fluorescent light or ultraviolet light, and slowly releases the fluorescence to have night-shining phenomena for hours when the irradiation stops.

Different from the luminous phosphor, this invention proposes a photo-luminescence coating which can be effectively stimulated to emit high bright fluorescence under irradiation of light with particular wavelength. Photo-luminescent tiles are formed by coating the surface of potteries, glasses, and stones with the photo-luminescence coating, the descriptions are as follows.

SUMMARY OF THE INVENTION

This invention provides a photo-luminescence coating is a mixture of photo-luminescence phosphors, glass powder, and/macromolecular compounds binder and a solvent. The weight ratio of the photo-luminescence phosphors can be arranged from 1% to 70%.

This invention proposes a photo-luminescence ceramic structure which includes a substrate and one or more photo-luminescence glass layers. The photo-luminescence glass layers are arranged on the substrate. The photo-luminescence coating is coated on the substrate and, after a drying, de-binder and sintering processes, the photo-luminescence glass layer, with photo-luminescence phosphors, is formed.

The photo-luminescence phosphors is stimulated by light with a short wavelength, ranging from 400 nm to 500 nm, such as blue light and purple light, and emits light with a longer wavelength, ranging from 500 nm to 700 nm, such as green, yellow and red light.

DETAILED DESCRIPTION OF THE INVENTION

Figure 1:
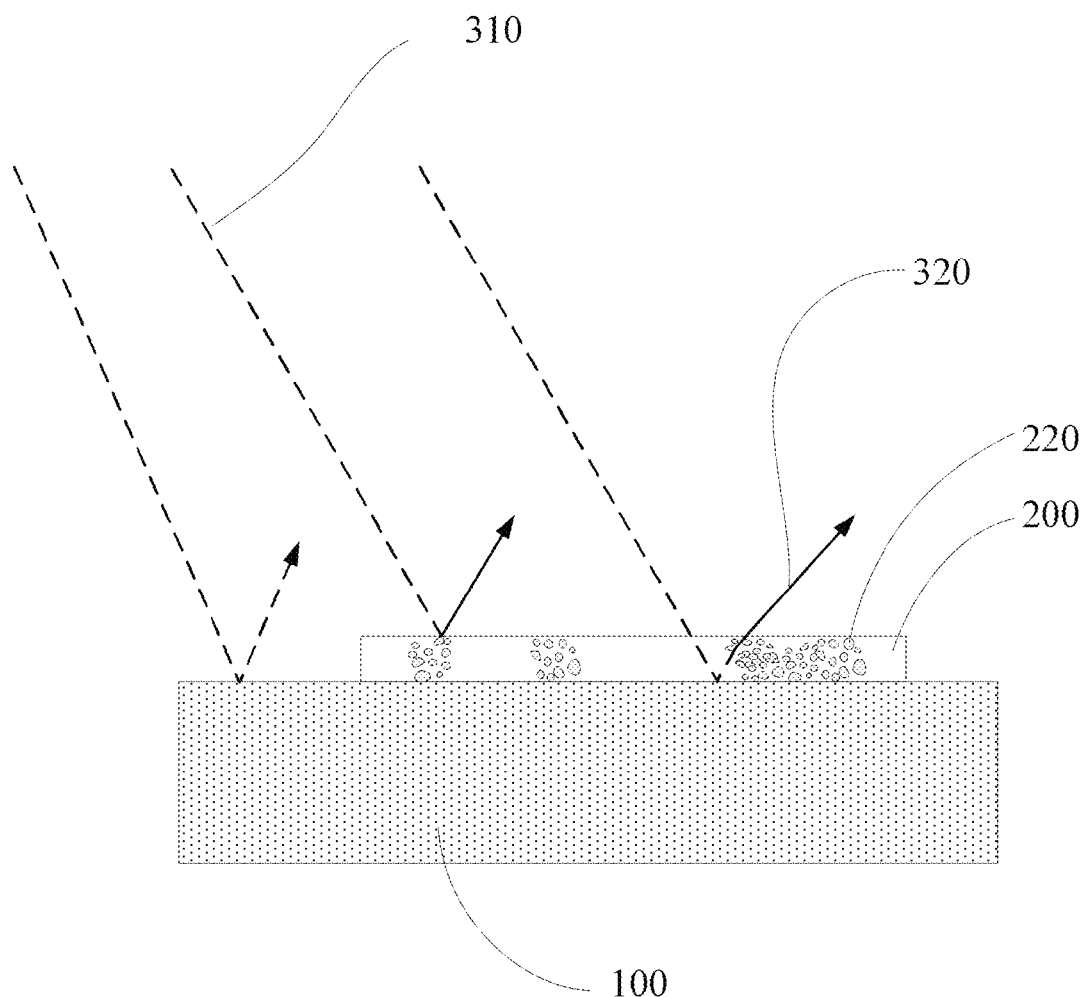
FIG. 1 illustrates the layered structure of an embodiment of a photo-luminescence ceramics in the present invention.

The present invention proposes a photo-luminescence coating, which is stimulated by light with particular wavelength to radiate florescence light with different wavelength.

The present invention proposes a substrate, which can be made by ceramic materials, glasses or stones, covered with a photo-luminescence layer. Under the illumination of lights with particular wavelengths, the photo-luminescence layer radiates fluorescence. Moreover, the fluorescence can be formed and designed to a particular pattern.

The present invention provides a photo-luminescence glass. Following are the description of the photo-luminescence coating, glass and applications thereof.

I. Ingredients of the Photo-luminescence Coating and the Manufacture Thereof

The photo-luminescence coating comprises photo-luminescence phosphors, glass powder, polymer binder/macromolecular compounds and solvent, and the weight ratio of photo-luminescence phosphors is arranged from 1% to 70%.

The photo-luminescence phosphors are stimulated under the illumination of light with shorter wavelength to radiate fluorescence light with longer wavelength. The wavelength range of illuminating light is between 400 nm to 500 nm, and the wavelength range of radiated fluorescence is between 500 nm to 700 nm. The wavelength of the illuminating light can be shorter but falls into the range of ultraviolet which might harm the environment and health. The wavelength of the radiated fluorescence could be longer, i.e. ultra-red light, and the range of visible light, between 500 nm to 700 nm, is chosen to enhance visual effects.

Different from the luminous phosphors, in this invention, the photo-luminescence phosphors are stimulated by an incident light with particular light and radiate immediately visible light radiated to create visual effects.

Selection of Photo-luminescence Phosphor

There are three major types of photo-luminescence phosphors: garnets, silicates and nitrides. Type one, garnets, for instance $Y_3Al_5O_{12}:Ce^{3+}$ transforms the absorbed blue lights into yellow lights; $(Y,Gd,Sm)_3(Al,Ga)_5O_{12}:Ce^{3+}$ transforms the absorbed blue lights into yellowish orange lights.

Type two, silicates, such as $Ca_3Si_2O_7:Eu^{2+}$ transforms the absorbed purple lights into red lights; $Ba_9Sc_2(SiO_4)_6:Eu^{2+}$ transforms the absorbed blue, purple lights into green lights; $Li_2SrSiO_4:Eu^{2+}$ transforms the absorbed purple lights into yellowish orange lights.

Type three, nitrides, for example $CaAlSiN_3:Eu^{2+}$ transforms the absorbed blue lights into red lights; $\alpha$-SiAlON:$Eu^{2+}$ transforms the absorbed blue lights into yellow lights; $\beta$-SiAlON:$Eu^{2+}$ transforms the absorbed blue lights into green lights.

The afore-mentioned three types of photo-luminescence phosphors can be mixed with different ratios to have various colors and different visual effect. Particular photo-luminescence phosphor is used to LED to increase the luminance efficiency.

Selection of Glass Powder

The selection of glass powder depends on the temperature tolerance of the substrate in the application afterwards. Generally, the sintering temperature of the glass powder should not be higher than the softening temperature of the substrate, unless the substrate is used to form a particular shape by softening. The appropriate sintering temperature, ranging from 500-1600 Celsius degree prefers, increases the density of the photo-luminescence glass layer and maintains the shape of the substrate.

Selection of Solvent and Polymer Binder/Macromolecular Compounds

Solvents can be classified as aqueous solvent and organic solvent, and used to disperse the ingredients mentioned above and adjusting the glue viscosity of photo-luminescence glass. The polymer binder/macromolecular compounds is used to fix the glass powder and photo-luminescence phosphors before sintering.

Manufacturing Process of Photo-luminescence Coating

A photo-luminescence coating or called photo-luminescence glass glue is made by stirring the mixture of photo-luminescence phosphors, glass powder, solvent, and polymer binder/macromolecular compounds.

It is noted that the photo-luminescence coating is coated on the substrate and, after a drying, de-binder and sintering process, a photo-luminescence glass layer is formed. The solvent and polymer binder/macromolecular compounds thereof will be removed completely, in the de-binding and sintering, from the photo-luminescence layer.

II. Applications and Manufacture of the Photo-luminescence Coating and Embodiments Thereof The description of the basic structure, theory and manufacture of photo-luminescence coating applications is as follow.

The Basic Structure of the Applications of Photo-luminescence Coating

FIG. 1 illustrates the layered structure of a photo-luminescence ceramics. A photo-luminescence glass layer 200, which is glass material containing photo-luminescence phosphors 220, is arranged on top of a substrate 100.

For better understanding, an embodiment illustrated, the material of substrate 100 is ceramics. It is noted that the material of substrate 100 should include but not be limited to ceramics, porcelain, glass, the combination thereof or other similar materials, such as floor tiles, wall tiles, exterior wall tiles and other tiles, and steles, flowerpots and pottery ornaments, or bathtubs, flush toilets, sinks and other ceramic bathroom facilities, or pots, bowls, ladles, plates, basins and other kitchenware, or even glass bottles, glass cups, glass doors and windows, lazurite and other glass made works of art.

Furthermore, a multiple-layer photo-luminescence glass can be formed on the substrate, and each layer has different pattern or color. Therefore, particular effects can be created, such as three-dimension visual effects, under irradiation of different incident lights or different stimulation effects.

Theory of Stimulation

Referring to FIG. 1, a photo-luminescence ceramics is taken as an example to illustrate the theory of stimulation-emission.

When incident light 310 radiates on the surface of the photo-luminescence ceramics substrate 100 of, the photo-luminescence phosphors 220 in photo-luminescence glass layer 200 is stimulated by the incident light 310 or its reflection light from the ceramic substrate 100, and the photo-luminescence phosphors 220 radiates photo-luminescence 320 with specialized color.

The colors radiated from the photo-luminescence phosphors 220 is based on the types of the photo-luminescence phosphor and the ratio arranged thereof. The radiated particular patterns are based on the spatial distribution of the photo-luminescence phosphors arranged in photo-luminescence glass layer.

The incident light 310 could be a light having a full spectrum, a certain range of or a particular wavelength, such as blue lights or purple lights, with wavelength ranging from 400 nm to 500 nm. The wavelength of the radiated photo-luminescence ranging from 500 nm to 700 nm.

In one embodiment, the incident light 310, blue or purple light, illuminates on the photo-luminescence ceramics, and the photo-luminescence phosphors 220 within the photo-luminescence glass layer 200 is stimulated to emit light with longer wavelength. In effect, the incident light 310 with shorter wavelength, blue or purple light, is transformed into the photo-luminescence 320 with longer wavelength, such as green, yellow or red light.

In applications, using the high-efficient photo-luminescence phosphors, the brightness treated by photo-luminescence will be higher than the surface without treatment. Therefore, under ambient light or low illumination, the blue light or purple light of ambient lights is able to stimulate noticeable photo-luminescence.

Manufacture

Figure 2:
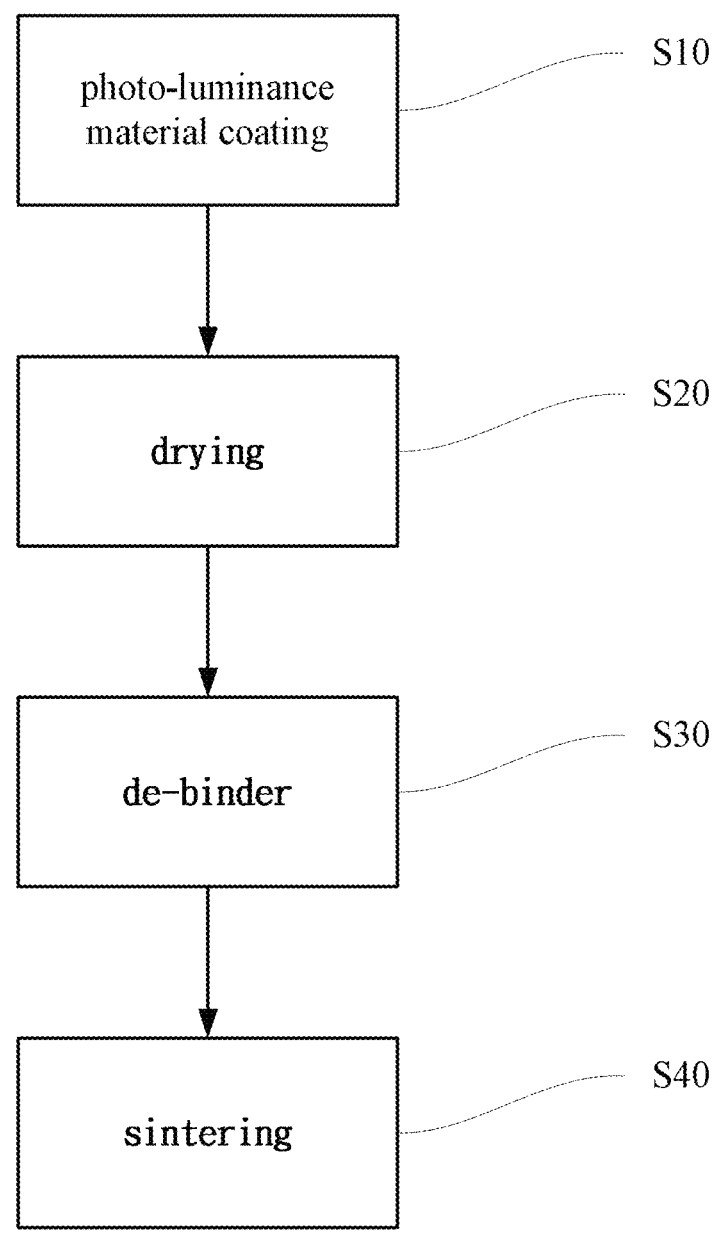
FIG. 2 illustrates the flowchart of an embodiment of manufacturing a photo-luminescence ceramics in the present invention.

The manufacturing process of photo-luminescence ceramics or glass is stated as follows accompanying with FIG. 2 for details.

Step S10: Photo-luminescence Material Coating

The coating method can be implemented by different ways, such as spray, printing, dipping spin, coating or smearing to glue the photo-luminescence coating, which contains photo-luminescence phosphors, on the ceramic substrate with a designed pattern.

Step S20: Drying

A drying process follows the coating to remove the solvent from the photo-luminescence coating by evaporation. There is no limitation in drying process, which can proceed in room temperature or higher temperature to increase the evaporation speed.

Step S30: De-binder

De-binder is a process that decomposes the polymer binder/macromolecular compounds into gas to be expelled under an appropriate temperature in a period of time. The de-binder temperature and the period depend on the kind of polymer binder/macromolecular compounds. Usually, the de-binder process takes hours or days under 200-500° C.

Step S40: Sintering

The sintering is to heat-treat photo-luminescence glass, which comprises photo-luminescence phosphors and glass powder, to bind on the surface of the substrate and to be dense. Sintering proceeds in high temperature, usually ranging from 500 to 1600° C.

It is emphasized that, during the sintering process, the photo-luminescence phosphors do not sinter and can still distribute over in the glass layer.

III. The Manufacture of a Photo-luminescence Glass and the Applications Thereof

The Structure of a Photo-luminescence Glass

Figure 3:
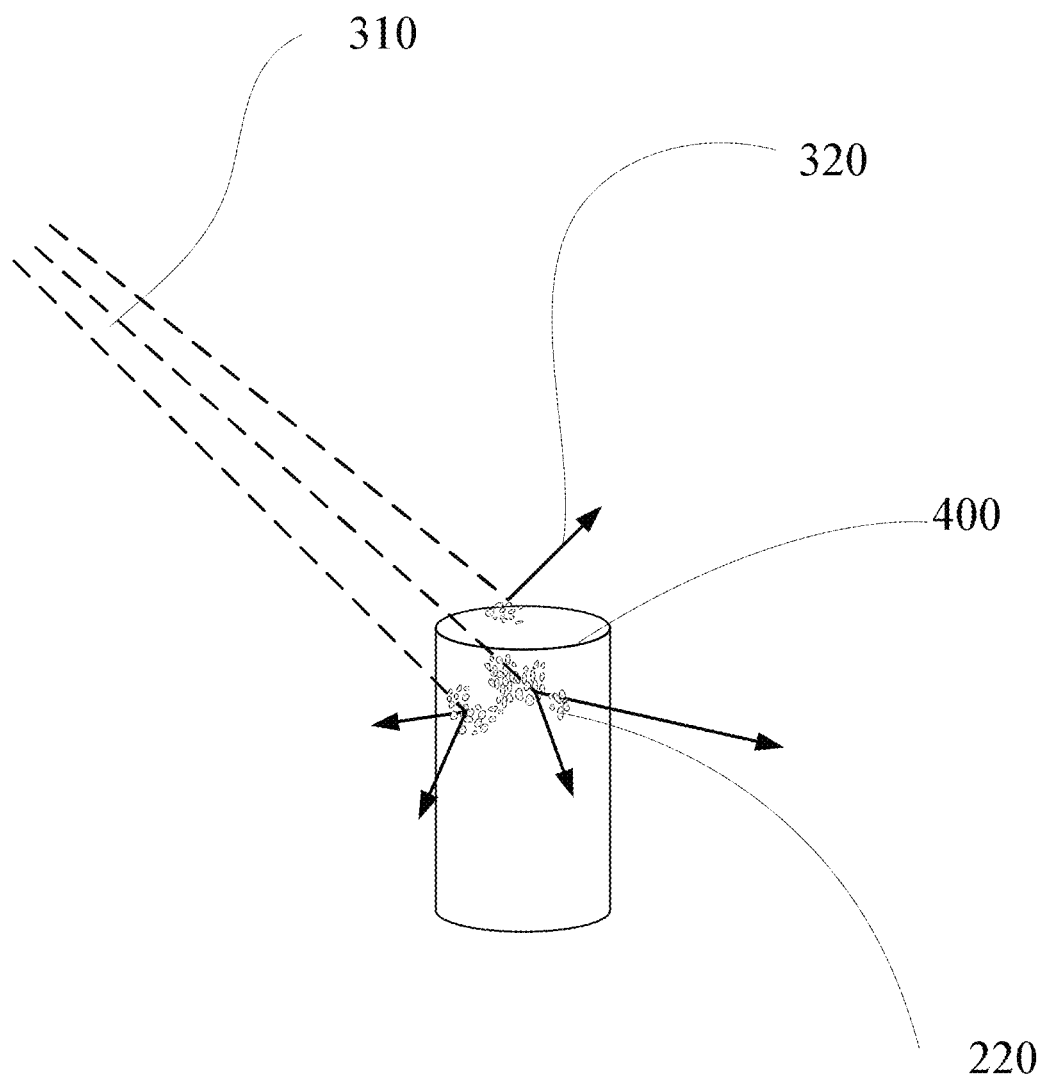
FIG. 3 illustrates the structure of an embodiment of a photo-luminescence glass.

Referring to the embodiments shown as FIG. 3, the glass mixed with photo-luminescence phosphors 220, which is stimulated by an incident light 310 to radiate photo-luminescence 320.

The Manufacture and the Applications Thereof

The photo-luminescence phosphors 220 are mixed into the melting glass and, after cooling to normal temperature, the photo-luminescence glass 400 is made. The photo-luminescence glass 400 mainly comprises the photo-luminescence phosphors 220 and the glass material, and the weight ratio of the photo-luminescence phosphors 220 ranges from 1% to 70%.

Similar with the embodiment illustrated in FIG. 1, the photo-luminescence glass 400 is irradiated by the blue or purple incident light 310, the light with shorter wavelength, and the photo-luminescence phosphors 220 is stimulated to emit photo-luminescence 320 with longer wavelength, such as green, yellow, red and etc.

In order to make the photo-luminescence glass have specialized shape, the shaping treat can be processed during the cooling photo-luminescence glass 400, or the glass can be heated up to softening point ($T_g$) or above, and then processed as the dining utensils, decorations, models or doors and windows with specialized shape, such as slices, bottles, cups, balls and others, after cooling.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A photo-luminescence ceramic comprises:
   a substrate; and
   a multiple-layer photo-luminescence glass coated on top of the substrate,
   wherein each layer of the photo-luminescence glass is made by mixing a mixture of photo-luminescence phosphor, glass powder, solvent, and polymer binder and then sintering, and the weight ratio of the photo-luminescence phosphor relative to the mixture ranges from 1% to 70%, and is able to be stimulated under irradiation of an incident light with a shorter wavelength, from 400 nm to 500 nm, to emit a photo-luminescence with a longer wavelength, from 500 nm to 700 nm,
   wherein each layer of the multiple-layer photo-luminescence glass is stimulated by the incident light to emit the light with different wavelength to express a specialized pattern, and therefore the multiple-layer photo-luminescence glass forms a three-dimension pattern on surface of the substrate and further the three-dimension pattern varies with the wavelength of the incident light.

2. The photo-luminescence ceramic as claimed in claim 1, wherein the substrate is selected from the group consisting of a ceramic material, a glass material and the mixture thereof.

3. The photo-luminescence ceramic as claimed in claim 1, wherein the substrate is selected from the group consisting of a tile, a wall tile, an exterior wall tile, a stele, a flowerpot, a pottery ornament, a bathtub, a flush toilet, a sink, a pot, a bowl, a ladle, a plate, a basin, a glass cup, a glass door and a glass window.

4. The photo-luminescence ceramic as claimed in claim 1, wherein the temperature of sintering ranges from 500 to 1600° C.

5. The photo-luminescence ceramic as claimed in claim 1, wherein the layers of the multiple-layer photo-luminescence glass have different colors or patterns.

* * * * *